(12) United States Patent
Bougaev et al.

(10) Patent No.: US 8,666,912 B2
(45) Date of Patent: Mar. 4, 2014

(54) MECHANICAL SHOCK FEATURE EXTRACTION FOR OVERSTRESS EVENT REGISTRATION

(75) Inventors: Anton A. Bougaev, La Jolla, CA (US); Aleksey M. Urmanov, La Jolla, CA (US); David K. McElfresh, San Diego, CA (US); Kenny C. Gross, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 898 days.

(21) Appl. No.: 12/708,721

(22) Filed: Feb. 19, 2010

(65) Prior Publication Data

US 2011/0208678 A1    Aug. 25, 2011

(51) Int. Cl.
*G06F 15/18* (2006.01)
*G06F 17/10* (2006.01)

(52) U.S. Cl.
USPC ............................................. 706/12; 706/20

(58) Field of Classification Search
USPC .......................................................... 706/12
See application file for complete search history.

(56) References Cited

U.S. PATENT DOCUMENTS 7,478,075 B2    1/2009   Urmanov et al.
2007/0244843 A1  10/2007  Bougaev et al.

OTHER PUBLICATIONS http://spiedigitallibrary.org/proceeding.aspx?articleid=842974
Pines et al., Structural health monitoring using empirical mode decomposition and the Hilbert phase [online], 2005 [retrieved on Sep. 14, 2012]. Retrieved from the Internet:< URL:http://spiedigitallibrary.org/proceeding.aspx?articleid=842974>.*
Huang et al., "The empirical mode decomposition and the Hilbert spectrum for nonlinear and non-stationary time series analysis," Proc. R. Soc. Lond. (A), 1998, pp. 903-995.

* cited by examiner

*Primary Examiner* — Jeffrey A Gaffin
*Assistant Examiner* — Nathan Brown, Jr.
(74) *Attorney, Agent, or Firm* — Brooks Kushman P.C.

(57) ABSTRACT

An electronic system includes an accelerometer. A method for excessive mechanical shock feature extraction for overstress event registration and cumulative tracking includes obtaining a sample from the accelerometer. Feature extraction is performed on the sample using empirical mode decomposition (EMD) to produce a plurality of modes. A pattern classifier is utilized for processing the plurality of modes to determine if the sample classifies as a shock event. If the sample classifies as a shock event, a shock event counter is incremented. If the shock event counter reaches a specified count, an indication to a user is generated.

19 Claims, 5 Drawing Sheets

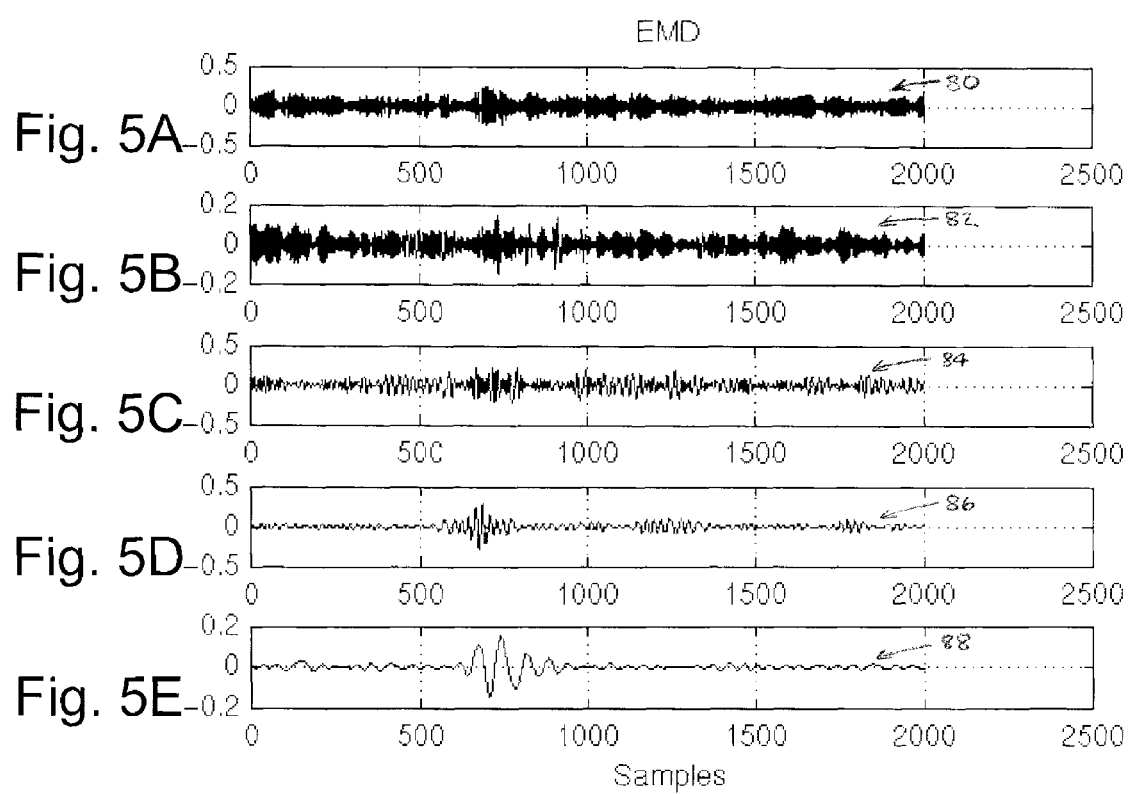

MECHANICAL SHOCK FEATURE EXTRACTION FOR OVERSTRESS EVENT REGISTRATION

BACKGROUND OF THE INVENTION

1. Field of the Invention

The invention relates to a method and apparatus for excessive mechanical shock feature extraction for overstress event registration in computer or electronic systems.

2. Background Art

In many cases, a computer server is used as a building block, for example, telco system integrators and defense electronics system integrators. When a computer server is integrated into a product, the whole product has to go through qualification and other tests where mechanical shock/vibration tests represent a significant challenge. When an integrated product fails a compliance test, it can be difficult to root cause the failure.

In most cases, no information about the instantaneous or cumulative stress/shock levels that the system was subjected to is available or readily provided. Therefore, there is a need for overstress event registration and cumulative tracking in computer systems.

Registering overstress events in computer systems presents a technical challenge. In more detail, installation of some sensor to register box level operational shock events has been limited due to limited dynamic range (low frequency cutoff of embedded accelerometers); limited storage/bandwidth capabilities for waveform time-domain monitoring; and extreme noisiness of the time domain data due to rotation of internal cooling fans. Accordingly, there are obstacles that prevent straight forward overstress event registration and cumulative tracking in computer systems.

Background information may be found in Huang, et al., "The empirical mode decomposition and the Hilbert spectrum for nonlinear and non-stationary time series analysis," *Proc. R. Soc. Lond.* (A) 1998. Further background information may be found in U.S. Pat. No. 7,478,075 and U.S. Pub. No. 2007/0244843.

SUMMARY OF THE INVENTION

In one embodiment of the invention, a method for excessive mechanical shock feature extraction for overstress event registration and cumulative tracking in an electronic system is provided. The electronic system includes an accelerometer. The method comprises obtaining a sample from the accelerometer. The method further comprises performing feature extraction on the sample using empirical mode decomposition (EMD) to produce a plurality of modes; and utilizing a pattern classifier for processing the plurality of modes to determine if the sample classifies as a shock event. If the sample classifies as a shock event, a shock event counter is incremented. If the shock event counter reaches a specified count, an indication to a user is generated. The indication may be viewed on a display device.

In a preferred embodiment, the pattern classifier is an R-cloud classifier. Further, the shock event counter may be implemented by a configurable moving-window time frame with the shock event counter counting the shock events in the moving-window time frame.

At the more detailed level, the invention comprehends an operating mode where the pattern classifier is used to determine the occurrence of shock events, and a training mode.

In this aspect, the pattern classifier is built based on a training data set including a plurality of modes. A shock event subset includes modes having shock signatures, and a normal operation subset includes modes without shock signatures. The pattern classifier is trained by obtaining a first training sample from the accelerometer. The first training sample is known to classify as a shock event. Feature extraction is performed on the first training sample using empirical mode decomposition (EMD) to produce a plurality of modes. One of the modes has a shock signature. The mode having the shock signature is added to the shock event subset; and the pattern classifier is rebuilt. The pattern classifier is further trained by obtaining a second training sample from the accelerometer. The second training sample is known to classify as normal operation. Feature extraction is performed on the second training sample using empirical mode decomposition (EMD) to produce a plurality of modes without shock signatures. The modes are added to the normal operation subset; and the pattern classifier is rebuilt.

In another embodiment of the invention, an electronic system including a service processor and an accelerometer is provided. The service processor is programmed to perform a method for excessive mechanical shock feature extraction for overstress event registration and cumulative tracking. The method comprises obtaining a sample from the accelerometer. The method further comprises performing feature extraction on the sample using empirical mode decomposition (EMD) to produce a plurality of modes; and utilizing a pattern classifier for processing the plurality of modes to determine if the sample classifies as a shock event. If the sample classifies as a shock event, a shock event counter is incremented. If the shock event counter reaches a specified count, an indication to a user is generated. The system may further comprise a computer server including the service processor and the accelerometer.

In another embodiment of the invention, a computer readable storage medium is provided. The medium has information stored thereon representing instructions executable by a computer to perform a method for excessive mechanical shock feature extraction for overstress event registration and cumulative tracking in an electronic system. The electronic system includes an accelerometer. The method comprises obtaining a sample from the accelerometer. The method further comprises performing feature extraction on the sample using empirical mode decomposition (EMD) to produce a plurality of modes; and utilizing a pattern classifier for processing the plurality of modes to determine if the sample classifies as a shock event. If the sample classifies as a shock event, a shock event counter is incremented. If the shock event counter reaches a specified count, an indication to a user is generated. The indication to the user may be a visible indication on a display device.

BRIEF DESCRIPTION OF THE DRAWINGS

FIG. 5A-5E demonstrate empirical mode decomposition (EMD) performed on the acceleration signal.

DETAILED DESCRIPTION OF THE PREFERRED EMBODIMENT

Figure 1:
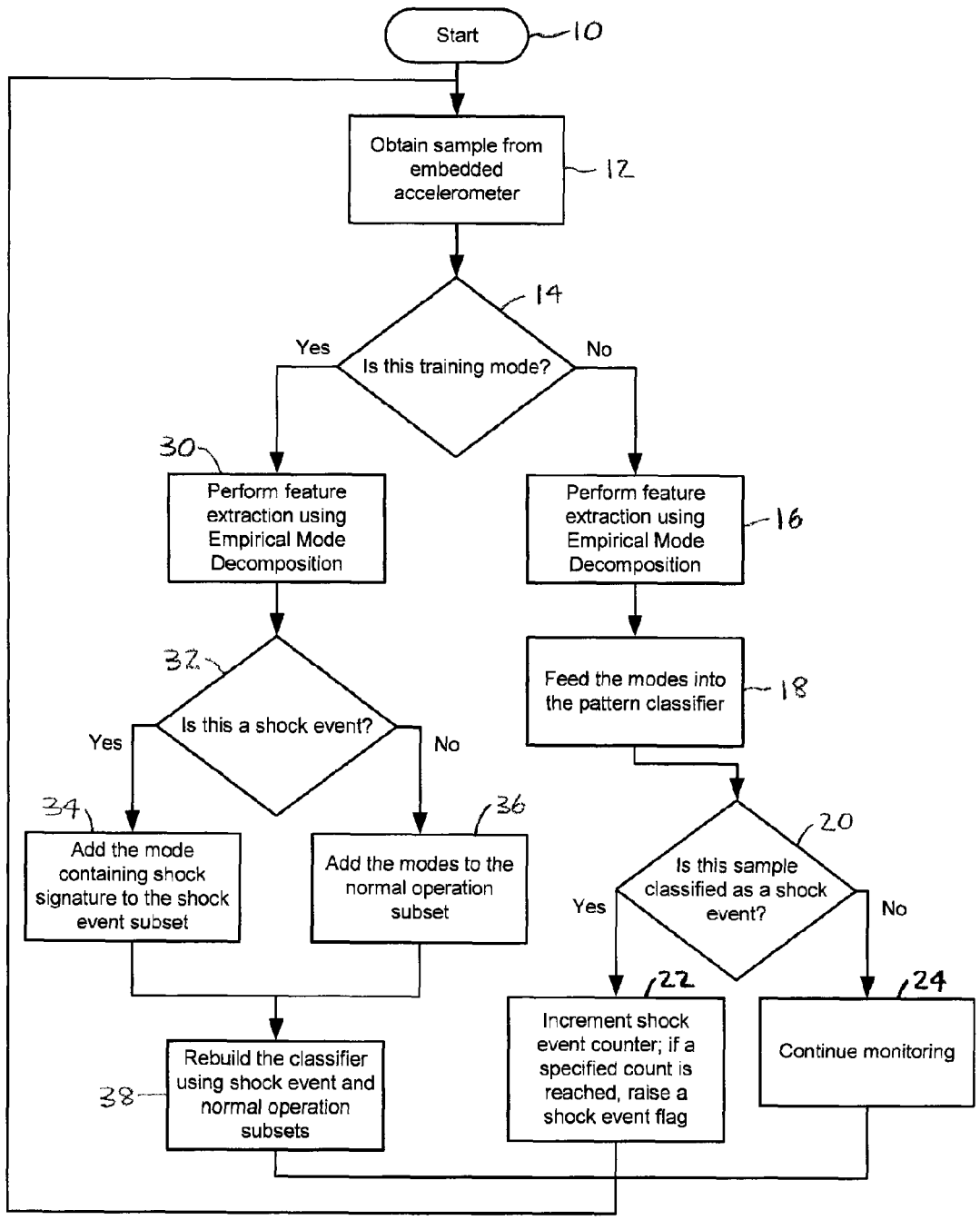
FIG. 1 illustrates a block diagram of the overstress event registration process in an embodiment of the invention.

FIG. 1 illustrates a block diagram of the overstress event registration process in an embodiment of the invention. In more detail, for overstress event registration in computer systems or electronic systems, a pattern recognition approach is used. The computer system includes an embedded accelerometer. In accordance with the invention, a feature extraction technique is used to extract characteristic shock "ringing" of parts and components due to a shock. The accelerometer may be implemented using microelectromechanical system (MEMS) technology. The shock features in the accelerometer signal are complimented by signal/features from other sources such as fan speeds, central processing unit (CPU)/power supply unit (PSU) voltages, and hard disk drive (HDD) variables that can be affected by a strong mechanical shock. Severe operating mechanical events, as well as sequences of more subtle events for which the accumulation of stresses can be detrimental, are registered and counted.

With continuing reference to FIG. 1, the process begins at block 10. At block 12, a sample is obtained from an embedded accelerometer. The overall process includes a training mode, and an operating mode. At decision block 14, flow proceeds to block 16 during the operating mode.

At block 16, feature extraction is performed using empirical mode decomposition (EMD). At block 18, the extracted modes are fed into the previously trained pattern classifier for the system to perform pattern recognition. At decision block 20, it is determined if the sample is classified as a shock event. When the sample is classified as a shock event, flow proceeds to block 22. At block 22, the shock event is registered and counted, and a shock event counter is incremented. In some implementations, a shock event flag is raised if a specified count is reached. When the sample is not classified as a shock event, flow proceeds to block 24 and monitoring continues. In general, after block 22 or block 24, flow proceeds back to block 12 for the next sample.

In a variation, the severity of a shock event is evaluated and the shock event is rated according to its severity. Shock events below a specified severity threshold can be discarded and the shock event counter is not incremented. For extremely large shock events an indication is sent to a user immediately without waiting until the shock event counter reaches a specified count. One of the methods for evaluating the severity of a shock event consists of the computation of the maximum acceleration during the registered shock event.

At decision block 14, flow proceeds to block 30 during the training mode. At block 30, feature extraction is performed using empirical mode decomposition (EMD). At decision block 32, flow proceeds to block 34 when the sample is a shock event, and the mode containing the shock signature is added to a shock event subset. When the sample is not a shock event, flow proceeds to block 36, and the modes are added to the normal operation subset. After block 34 or block 36, the classifier is rebuilt using the updated shock event and normal operation subsets at block 38.

Figure 2:
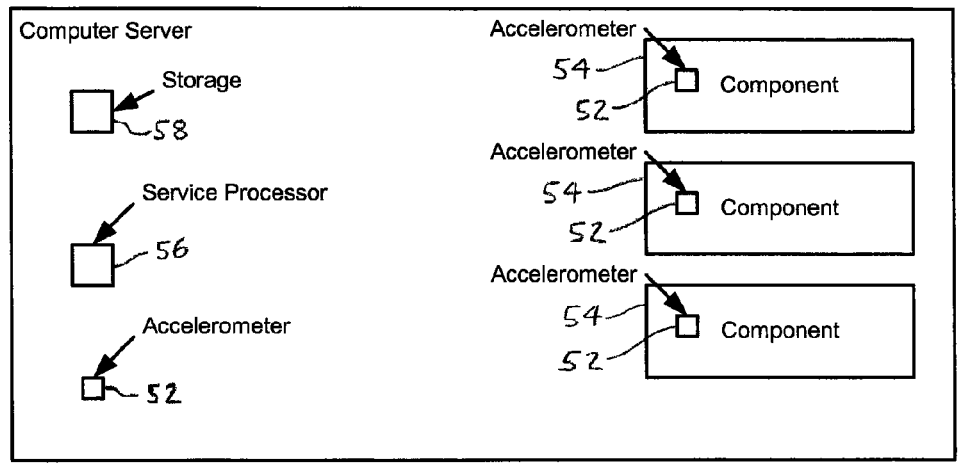
FIG. 2 illustrates a computer server including embedded accelerometers on various components.

FIG. 2 illustrates a computer server 50 including an embedded accelerometer 52. Several accelerometers 52 may be installed on various components 54 inside the computer server 50. Some existing computer servers employ embedded accelerometers to regulate internal and external vibration so no additional instrumentation is required for some embodiments of the invention to be deployed in computer systems. A service processor 56 performs certain management tasks for computer server 50. Processing for embodiments of the invention may take place at service processor 56. Offboard processing is also possible for some applications. Computer server 50 also includes storage 58 which may be used by service processor 56.

For a demonstration of an embodiment of the invention, a Sun computer server (T1000), from Sun Microsystems, Inc., Santa Clara, Calif., was selected as a system under test (SUT). The SUT was mounted on a shaker table in rack-simulating fixtures. The shaker table was programmed to input half-sine shocks of various severity into the SUT.

Several accelerometers were installed on various components inside the SUT to register vibration levels experienced by the components during normal operation of the SUT and during external shock events. The signal from the accelerometers was acquired by a data acquisition system. The time domain signal is demonstrated in FIG. 3 at 60.

Figure 3:
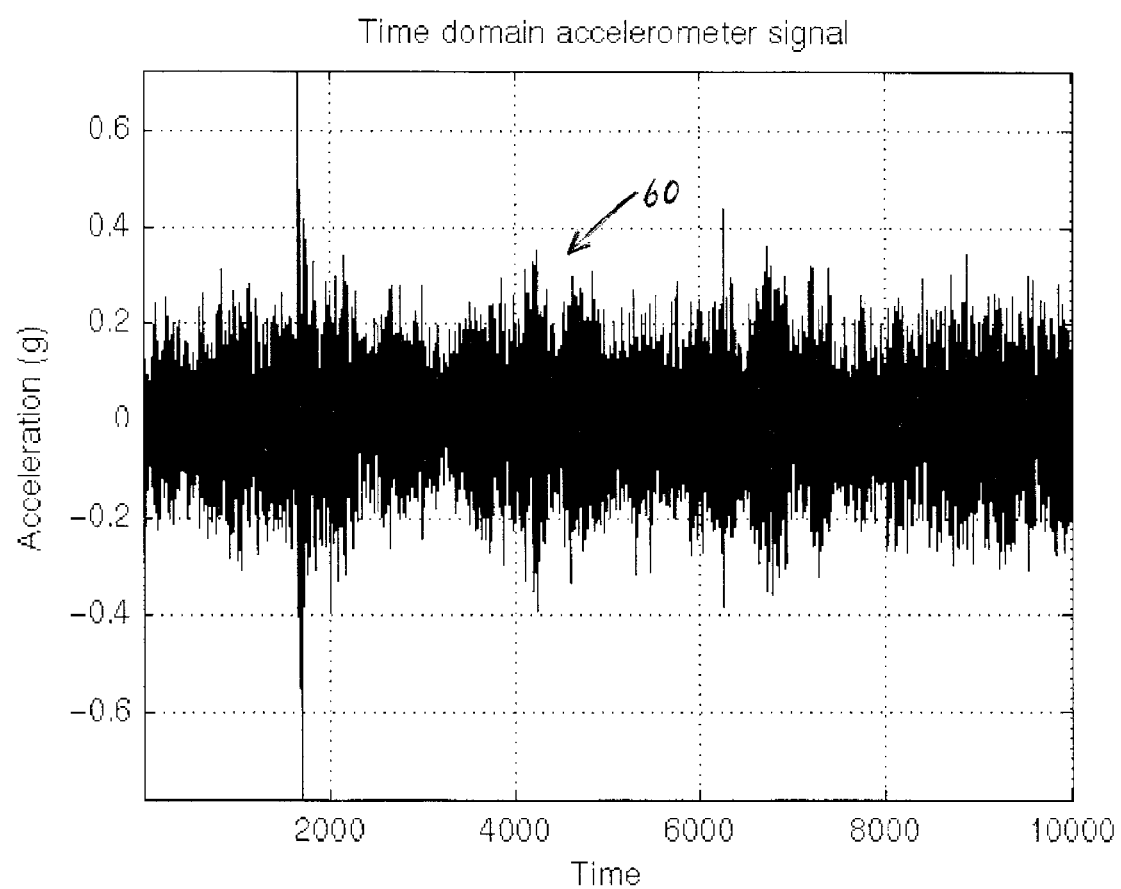
FIG. 3 depicts a time domain acceleration signal from an accelerometer inside a system under test (SUT) during normal SUT operation and during an external shock event for a demonstration of an embodiment of the invention.

In more detail, FIG. 3 depicts the time domain acceleration signal 60 from one of the accelerometers inside the SUT during normal SUT operation, and during an external shock event.

The time domain vibration signal 60 is cumbersome to deal with. Due to required high sampling rates and inevitable high noise level of embedded accelerometers there is no reliable method for registering overstress events from the time domain data. An additional challenge in the domain of enterprise computer servers is the limited bandwidth of the service bus, limited storage available for the acceleration data (typically sampled at 10s of kHz), and very limited computational resources of the system processor making the processing of the time domain acceleration data impractical. Various feature extraction methods are employed to reduce the amount of data and to preserve the features differentiating normal operation from events of interest.

Figure 4:
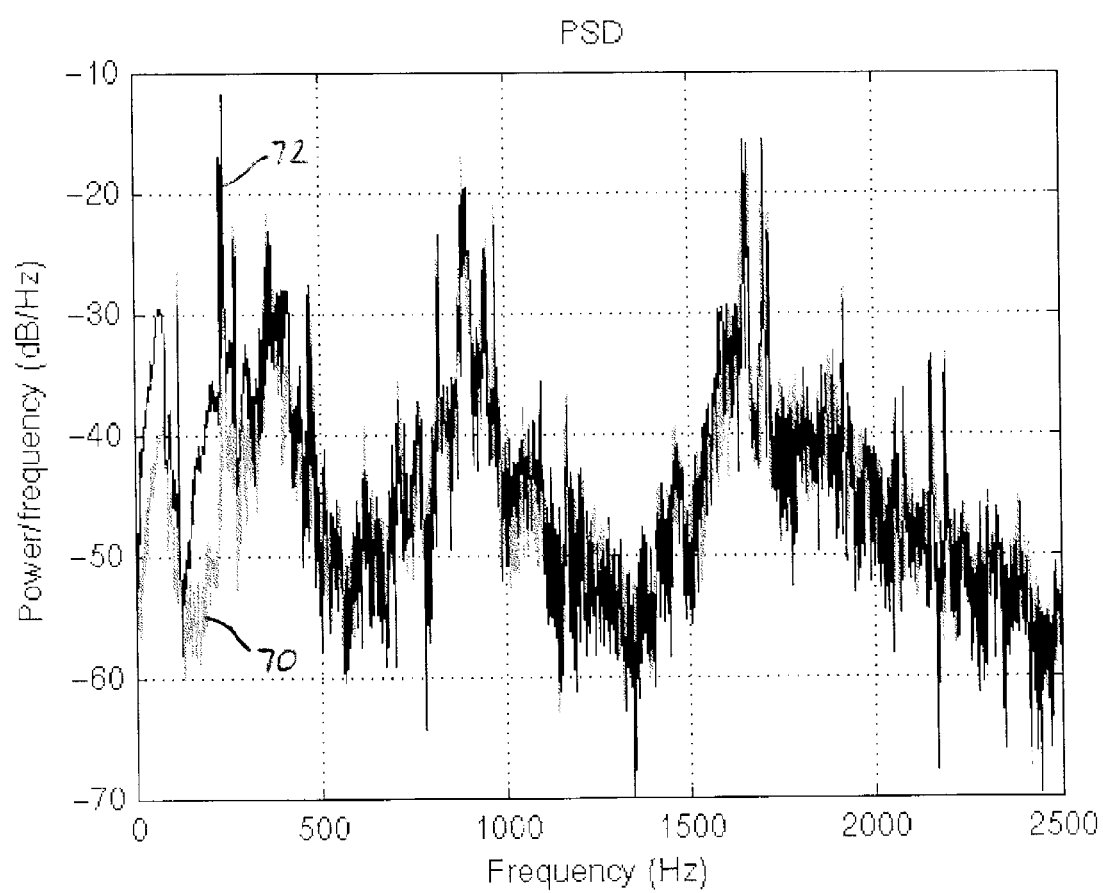
FIG. 4 depicts power spectral density of the accelerometer signal during normal operation (dotted line) and during a shock event (solid line)

A widely used feature extraction method for vibration data is the Fast Fourier Transform (FFT). The amount of data is then reduced by keeping only few components (or by computing only few components in the first place) that represent features sufficient to differentiate normal and abnormal operation in a specific context. The FFT of the time domain acceleration data is shown in FIG. 4. The FFT for the normally operating SUT is shown in dotted line at 70, and the FFT of the accelerometer signal during a shock event is shown in solid line at 72.

As it can be seen, it is practically impossible to differentiate between the spectrum 70 representing normal SUT operation and the spectrum 72 corresponding to the shock event (impossible to achieve desirable false alarm rates while maintaining the desirable missed alarm rates). This becomes even less possible when dynamic variation of system fan speeds and possible rattling of internal components and the whole SUT are allowed.

The pattern recognition approach used in embodiments of the invention overcomes and avoids the above challenges. Empirical mode decomposition (EMD) is utilized as the feature extraction step in an advanced pattern recognition framework that, when integrated with other internal physical performance metrics, is computationally efficient and achieves capabilities never before possible in the enterprise computing industry. After EMD is applied to the time domain signal, the individual modes carry features corresponding to various events including shock events. FIGS. 5A-5E demonstrate the EMD performed on the acceleration signal. The modes clearly indicate the shock event that was previously not distinguishable, specifically, the feature between the $500^{th}$ and $1000^{th}$ sample in the mode shown in FIG. 5E.

The empirical mode features are fed into a pattern classifier that is trained to detect shock events. During operation, the pattern classifier is continuously fed the empirical mode features and classifies signal signatures as normal or as shock events. A shock event counter is employed that registers the shock event count in a configurable moving-window time frame and generates an alarm if the cumulative event count reaches a specified value.

It is appreciated by one skilled in the art that several different pattern classifiers can be employed in various embodiments of the method and apparatus. For example, k-nearest neighbor classifiers, quadratic classifiers or radial-basic function classifiers can be used. The preferred embodiment, however, utilizes the R-cloud classifier described in U.S. Pat. No. 7,478,075, "Reducing the size of a training set for classification" and U.S. patent application Ser. No. 11/387,253, "Method and apparatus for classifying data using R-functions," both of which are hereby incorporated by reference.

In more detail, FIGS. 5A-5E demonstrate empirical mode decomposition (EMD) performed on the acceleration signal, and the resulting empirical mode decomposition components from the acceleration data. FIG. 5A depicts the original data at 80. FIGS. 5B-5E depict first through fourth components 82, 84, 86, 88, respectively. In accordance with empirical mode decomposition, each component 82, 84, 86, 88 is an intermediate mode function (IMF). Component 88 clearly includes the shock event.

Embodiments of the invention have many potential applications, for example, enterprise server assets. Embodiments of the invention may also be applied to military, avionic, aerospace, and naval electronic systems. It is appreciated that embodiments of the invention allow detecting and tracking instantaneous and cumulative shock/vibe events that contribute to the long-term operational health of enterprise servers as well as other electronics, without demanding extremely high bandwidth system buses and processing elements to track shock/vibe events.

Figure 6:
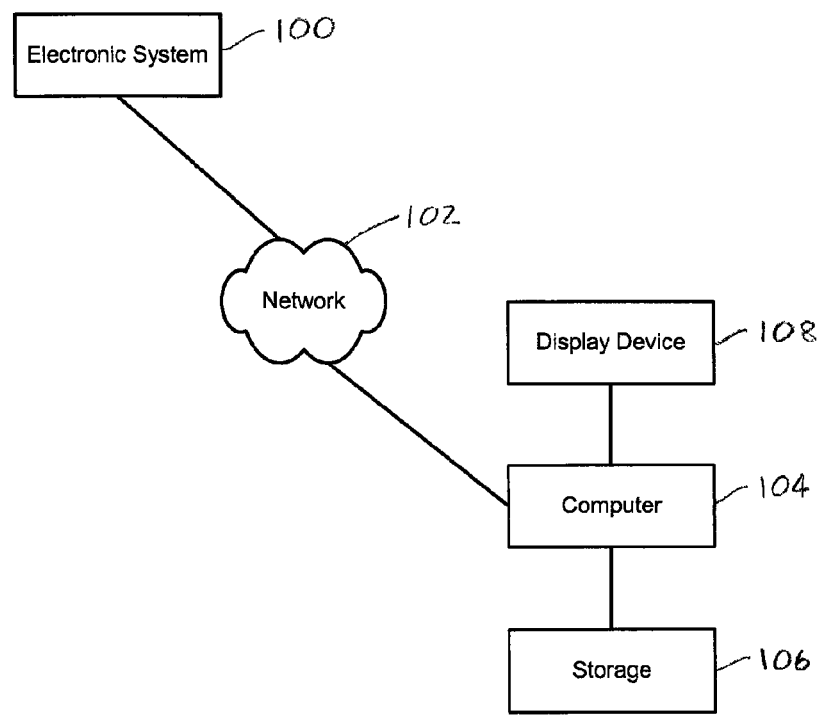
FIG. 6 illustrates an electronic system with an embedded accelerometer connected over a network to a computer.

In FIG. 6, an electronic system 100 has an embedded accelerometer. Electronic system 100 is connected to network 102. Computer 104 is also connected to network 102. Computer 104 includes storage 106 and display device 108.

In some embodiments of the invention, electronic system 100 includes a service processor that performs overstress event registration. Events or other indications may be logged at electronic system 100, and computer 104 may be used to view events or other indications. In other embodiments of the invention, electronic system 100 archives data, and computer 104 performs the processing for overstress event registration. It is appreciated that a variety of approaches for implementing the processing are possible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for excessive mechanical shock feature extraction for overstress event registration and cumulative tracking in an electronic system, the electronic system including an accelerometer, the method comprising:
   obtaining a sample from the accelerometer;
   performing feature extraction on the sample using empirical mode decomposition (EMD) to produce a plurality of modes;
   utilizing a pattern classifier for processing the plurality of modes to determine if the sample classifies as a shock event;
   if the sample classifies as a shock event, incrementing a shock event counter;
   if the shock event counter reaches a specified count, generating an indication to a users; and
   if the sample classifies as a shock event, evaluating a severity of the shock event, and when the severity exceeds a threshold, immediately generating an indication to the user.

2. The method of claim 1 wherein the pattern classifier is an R-cloud classifier.

3. The method of claim 1 wherein the shock event counter is implemented by a configurable moving-window time frame with the shock event counter counting the shock events in the moving-window time frame.

4. The method of claim 1 wherein the pattern classifier is built based on a training data set including a plurality of modes wherein a shock event subset includes modes having shock signatures and a normal operation subset includes modes without shock signatures, the method further comprising:
   training the pattern classifier by:
      obtaining a first training sample from the accelerometer, wherein the first training sample is known to classify as a shock event;
      performing feature extraction on the first training sample using empirical mode decomposition (EMD) to produce a plurality of modes, wherein one of the modes has a shock signature;
      adding the mode having the shock signature to the shock event subset; and
      rebuilding the pattern classifier.

5. The method of claim 4 further comprising:
   training the pattern classifier by:
      obtaining a second training sample from the accelerometer, wherein the second training sample is known to classify as normal operation;
      performing feature extraction on the second training sample using empirical mode decomposition (EMD) to produce a plurality of modes without shock signatures;
      adding the modes to the normal operation subset; and
      rebuilding the pattern classifier.

6. The method of claim 1 further comprising:
   if the sample classifies as a shock event, evaluating a severity of the shock event, and only incrementing the shock event counter when the severity exceeds a threshold.

7. The method of claim 1 further comprising:
   displaying the indication on a display device.

8. An electronic system including a service processor and an accelerometer, the service processor being programmed to perform a method for excessive mechanical shock feature extraction for overstress event registration and cumulative tracking, the method comprising:
   obtaining a sample from the accelerometer;
   performing feature extraction on the sample using empirical mode decomposition (EMD) to produce a plurality of modes;
   utilizing a pattern classifier for processing the plurality of modes to determine if the sample classifies as a shock event;
   if the sample classifies as a shock event, incrementing a shock event counter;
   if the shock event counter reaches a specified count, generating an indication to a user; and if the sample classifies as a shock event, evaluating a severity of the shock event, and when the severity exceeds a threshold, immediately generating an indication to the user.

9. The system of claim 8 wherein the pattern classifier is an R-cloud classifier.

10. The system of claim 8 wherein the shock event counter is implemented by a configurable moving-window time frame with the shock event counter counting the shock events in the moving-window time frame.

11. The system of claim 8 wherein the pattern classifier is built based on a training data set including a plurality of modes wherein a shock event subset includes modes having shock signatures and a normal operation subset includes modes without shock signatures, wherein the method further comprises:
    training the pattern classifier by:
        obtaining a first training sample from the accelerometer, wherein the first training sample is known to classify as a shock event;
        performing feature extraction on the first training sample using empirical mode decomposition (EMD) to produce a plurality of modes, wherein one of the modes has a shock signature;
        adding the mode having the shock signature to the shock event subset; and
        rebuilding the pattern classifier.

12. The system of claim 11, wherein the method further comprises:
    training the pattern classifier by:
        obtaining a second training sample from the accelerometer, wherein the second training sample is known to classify as normal operation;
        performing feature extraction on the second training sample using empirical mode decomposition (EMD) to produce a plurality of modes without shock signatures;
        adding the modes to the normal operation subset; and
        rebuilding the pattern classifier.

13. The system of claim 8 further comprising:
    a computer server including the service processor and the accelerometer.

14. A non-transitory computer readable storage medium having information stored thereon representing instructions executable by a computer to perform a method for excessive mechanical shock feature extraction for overstress event registration and cumulative tracking in an electronic system, the electronic system including an accelerometer, the method comprising:
    obtaining a sample from the accelerometer;
    performing feature extraction on the sample using empirical mode decomposition (EMD) to produce a plurality of modes;
    utilizing a pattern classifier for processing the plurality of modes to determine if the sample classifies as a shock event;
    if the sample classifies as a shock event, incrementing a shock event counter;
    if the shock event counter reaches a specified count, generating an indication to a user; and
    if the sample classifies as a shock event, evaluating a severity of the shock event, and when the severity exceeds a threshold, immediately generating an indication to the user.

15. The medium of claim 14 wherein the pattern classifier is an R-cloud classifier.

16. The medium of claim 14 wherein the shock event counter is implemented by a configurable moving-window time frame with the shock event counter counting the shock events in the moving-window time frame.

17. The medium of claim 14 wherein the pattern classifier is built based on a training data set including a plurality of modes wherein a shock event subset includes modes having shock signatures and a normal operation subset includes modes without shock signatures, wherein the method further comprises:
    training the pattern classifier by:
        obtaining a first training sample from the accelerometer, wherein the first training sample is known to classify as a shock event;
        performing feature extraction on the first training sample using empirical mode decomposition (EMD) to produce a plurality of modes, wherein one of the modes has a shock signature;
        adding the mode having the shock signature to the shock event subset; and
        rebuilding the pattern classifier.

18. The medium of claim 17, wherein the method further comprises:
    training the pattern classifier by:
        obtaining a second training sample from the accelerometer, wherein the second training sample is known to classify as normal operation;
        performing feature extraction on the second training sample using empirical mode decomposition (EMD) to produce a plurality of modes without shock signatures;
        adding the modes to the normal operation subset; and
        rebuilding the pattern classifier.

19. The medium of claim 14 wherein the indication to the user is a visible indication on a display device.

* * * * *